United States Patent
Samar et al.

(10) Patent No.: US 8,428,601 B2
(45) Date of Patent: Apr. 23, 2013

(54) WIRELESS NETWORK INTER-TECHNOLOGY HANDOFFS

(75) Inventors: Prince Samar, Chelmsford, MA (US);
Harjot Saluja, Nashua, NH (US);
Woojune Kim, Arlington, MA (US);
Douglas Norman Knisely, Wheaton, IL (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 329 days.

(21) Appl. No.: 12/776,164

(22) Filed: May 7, 2010

(65) Prior Publication Data
US 2010/0284370 A1 Nov. 11, 2010

Related U.S. Application Data

(60) Provisional application No. 61/176,385, filed on May 7, 2009.

(51) Int. Cl.
*H04W 36/38* (2009.01)

(52) U.S. Cl.
USPC ......... 455/439; 370/331; 370/395.5; 370/401

(58) Field of Classification Search ............ 370/276, 370/277, 310, 315, 328, 331, 332, 339, 342, 370/343, 345, 464, 465, 466, 490, 395.5, 370/401; 455/421, 422.1, 432.1, 432.2, 436–444, 455/561

See application file for complete search history.

(56) References Cited

U.S. PATENT DOCUMENTS

| | | | |
|---|---|---|---|
| 6,009,328 | A | 12/1999 | Muszynski |
| 6,018,662 | A | 1/2000 | Periyalwar et al. |
| 6,711,144 | B1 | 3/2004 | Kim et al. |
| 6,731,618 | B1 | 5/2004 | Chung et al. |
| 6,741,862 | B2 | 5/2004 | Chung et al. |
| 6,781,999 | B2 | 8/2004 | Eyuboglu et al. |
| 7,170,871 | B2 | 1/2007 | Eyuboglu et al. |
| 7,200,391 | B2 | 4/2007 | Chung et al. |
| 7,242,958 | B2 | 7/2007 | Chung et al. |
| 7,277,446 | B1 | 10/2007 | Abi-Nassif et al. |
| 7,299,278 | B2 | 11/2007 | Ch'ng |
| 7,515,643 | B2 | 4/2009 | Chung |

(Continued)

FOREIGN PATENT DOCUMENTS

| | | |
|---|---|---|
| GB | 2452688 | 3/2009 |
| WO | WO 2010/129897 | 11/2010 |

OTHER PUBLICATIONS

Paul Bender, et al., "CDMA/HDR: A Bandwidth-Efficient High-Speed Wireless Data Service for Nomadic Users", IEEE Communications Magazine, Jul. 2000.

(Continued)

*Primary Examiner* — Michael Thier
*Assistant Examiner* — Curtis A Alia
(74) *Attorney, Agent, or Firm* — Fish & Richardson P.C.

(57) ABSTRACT

In general, a method is described for handing off a communication session associated with a mobile device from a first network running a first technology to a second network running a second technology different from the first technology, the method comprising: establishing a communication channel with the mobile device through the first network; and enabling, through the communication channel, a handoff of the communication session associated with the mobile device from the first network to the second network.

20 Claims, 3 Drawing Sheets

U.S. PATENT DOCUMENTS

| | | |
|---|---|---|
| 7,515,909 B2 | 4/2009 | Jain et al. |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 2002/0196749 A1 | 12/2002 | Eyuboglu et al. |
| 2004/0235479 A1* | 11/2004 | Cho et al. ............... 455/441 |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0109818 A1 | 5/2006 | Ramanna et al. |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Palnati et al. |
| 2007/0077948 A1 | 4/2007 | Sharma et al. |
| 2007/0097916 A1 | 5/2007 | Eyuboglu et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0213059 A1* | 9/2007 | Shaheen ............... 455/436 |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0170548 A1* | 7/2008 | Suh et al. ............... 370/331 |
| 2008/0253550 A1 | 10/2008 | Ch'ng et al. |
| 2008/0254792 A1 | 10/2008 | Ch'ng |
| 2008/0310371 A1* | 12/2008 | Russell ............... 370/331 |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'ng et al. |
| 2009/0170520 A1 | 7/2009 | Jones |
| 2009/0170547 A1 | 7/2009 | Raghothaman et al. |
| 2009/0172169 A1 | 7/2009 | Ramaswamy et al. |
| 2009/0172397 A1 | 7/2009 | Kim |
| 2009/0186626 A1 | 7/2009 | Raghothaman et al. |
| 2009/0262697 A1 | 10/2009 | To et al. |
| 2009/0318162 A1 | 12/2009 | Chung et al. |
| 2010/0054207 A1* | 3/2010 | Gupta et al. ............... 370/331 |
| 2010/0054219 A1 | 3/2010 | Humblet et al. |
| 2010/0075658 A1 | 3/2010 | Hou et al. |
| 2010/0085910 A1 | 4/2010 | Humblet |
| 2010/0284370 A1 | 11/2010 | Samar et al. |

OTHER PUBLICATIONS

Paul Bender & Ramin Rezalifar, "Draft Baseline Text for the 1xEV-DO Upper Layers (excluding Physical Layer)", 3GPP2, Aug. 17, 2000.

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C. S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 1, Mar. 2004 (1083 pages).

International Search Report and Written Opinion for PCT international application No. PCT/US2010/034090, mailed Jun. 30, 2010 (11 pages).

International Preliminary Report on Patentability for PCT international application No. PCT/US2010/034090, mailed Nov. 17, 2011 (6 pages).

* cited by examiner

WIRELESS NETWORK INTER-TECHNOLOGY HANDOFFS

CLAIM OF PRIORITY

This application claims priority under 35 U.S.C. §119(e) to provisional U.S. Patent Application 61/176,385, filed May 7, 2009, the entire contents of which are hereby incorporated by reference.

BACKGROUND 3G ("third generation") networks are widely deployed networks that provide users with a wide range of wireless services including wireless voice telephone, video calls, and broadband wireless data. Examples of 3G technologies include code division multiple access ("CDMA") 2000 and Evolution-Data Optimized ("EVDO"), which was originally referred to as High Data Rate ("HDR"). CDMA and EVDO refer to the same 3G technology but represent various evolutions of the 3G technology.

The CDMA standard is used for high-speed data-only services. CDMA has been standardized by the Telecommunication Industry Association ("TIA") as TIA/EIA/IS-856 (see "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification," 3GPP2 C.S0024-A, Version 2.0, June 2005, and is also incorporated herein by reference).

The Evolution-Data Optimized ("EVDO") standard is used for the wireless transmission of data through radio signals, using multiplexing techniques including CDMA to maximize both individual user's throughput and the overall system throughput. EVDO was designed as an evolution of the CDMA 2000 standard that would support high data rates and could be deployed alongside a wireless carrier's voice services. Initially, the EVDO standard was named High Data Rate (HDR), but was renamed to EVDO after the standard was ratified by the International Telecommunication Union ("ITU"). (See P. Bender, et al., "CDMA/HDR: A Bandwidth-Efficient High-Speed Wireless Data Service for Nomadic Users," IEEE Communications Magazine, July 2000; and Third Generation Partnership Project 2 ("3GPP2"), "Draft Baseline Text for 1xEV-DO," Aug. 21, 2000).

Advances in telecommunications technology has brought forth a newly developed class of technologies referred to as 4G ("fourth generation"). Examples of 4G technology include Long-Term Evolution ("LTE") and Worldwide Interoperability for Microwave Access ("WiMAX") telecommunications technologies. Generally, 3G networks, such as EVDO, have wide deployment. 4G networks, such as WiMAX and LTE, are initially deployed in a limited area (concentrated in larger cities, for example) and often have limited coverage area.

Prior art systems minimally facilitate a handoff when a mobile device transitions from a network running 3G technology to a network running 4G technology and require the mobile device to close its initial internet protocol ("IP") connection with the network running the 3G technology, open a new IP connection with the network running 4G technology, and wait for the network running 4G technology to perform a new mobile IP registration to allow connectivity to IP services. This process is commonly referred to as a "hard handoff," and it is akin to disconnecting a network cable of an IP-enabled device, e.g., a laptop, from a first network and reconnecting it to a different network. During a hard handoff, the mobile device loses the IP connection and access to the IP services as the mobile device transitions between networks. For example, in one prior art system, IP level connectivity is maintained during a handoff, but there is no pre-registration or setup and/or allocation of resources on the target network before the mobile device moves to the target network. This lack of pre-registration and resource allocation leads to long interruption in user services.

SUMMARY

In one aspect of the present disclosure, a method for handing off a communication session associated with a mobile device from a first network running a first technology to a second network running a second technology different from the first technology comprises: establishing a communication channel with the mobile device through the first network; and enabling, through the communication channel, a handoff of the communication session associated with the mobile device from the first network to the second network.

Implementations of the disclosure may include one or more of the following features. In some implementations, the method further comprises: receiving, through the communication channel, one or more signaling messages from the mobile device, wherein the one or more signaling messages include session context information for the communication session associated with the mobile device. The method may also further comprise receiving, through the communication channel, a request from the mobile device to handoff the communication session to the second network.

In other implementations, the method further comprises generating, based on the session context information, a message using a format defined by the second technology running on the second network; and preparing the second network for the handoff of the communication session to the second network by transferring the message to the second network. The method may also further comprise sending, to an authorization server, a message to authenticate permission of the mobile device to access the second network.

In some implementations, the method further comprises receiving, from the second network, one or more of connection setup information and resource allocation information for establishing a connection with the second network; and forwarding the received information to the mobile device through the communication channel. In other implementations: the first network comprises one or more implementations of the first technology provided by one or more network infrastructure vendors. The second network comprises one or more implementations of the second technology provided by one or more network infrastructure vendors. One or more of the first technology and the second technology comprise one or more of LTE, E-UTRAN, EVDO, WiMAX, WiFi, Universal Mobile Telephone System ("UMTS"), High-Speed Downlink Packet Access ("HSDPA"), High Speed Uplink Packet Access ("HSUPA") and other wireless technologies. The handoff of the communication session from the first network to the second network is enabled using one or more: existing interface protocols associated with one or more of the first network and the second network, inter-subnet interface protocols, inter-node handoff interface protocols and mobility interface protocols.

In some implementations, the communication channel comprises a first communication channel, the handoff comprises a first handoff and the method further comprises: establishing a second communication channel with the mobile device through the first network; and enabling, through the second communication channel, a second handoff of the second communication session associated with the mobile device from the first network to a third network, wherein the first handoff and the second handoff are simultaneously enabled.

In another aspect of the disclosure, a system for handing off a communication session associated with a mobile device from a first network running a first technology to a second network running a second technology different from the first technology comprises: a radio network controller device configured to receive signals from the first and second networks and to transmit signals to the first and second networks, the device being configured to: establish a communication channel with the mobile device through the first network; and enable, through the communication channel, a handoff of the communication session associated with the mobile device from the first network to the second network. Implementations of this aspect of the present disclosure can include one or more of the foregoing features.

In yet another aspect of the disclosure, a computer-readable storage medium having instructions stored thereon that, when executed by a processor of a device, cause the processor to: establish a communication channel with a mobile device through a first network running a first technology; and enable, through the communication channel, a handoff of a communication session associated with the mobile device from the first network to a second network running a second technology different from the first technology. Implementations of this aspect of the present disclosure can include one or more of the foregoing features.

DETAILED DESCRIPTION

A mobile device is connected to a network ("first network"), including a WiMAX network or an LTE network, running a first technology. Over the first network, a service provider provides the mobile device with access to IP services, including Internet browsing, streaming media and voice over IP. As the mobile device moves out of range of the first network and into range of another different, network ("second network"), the mobile device transitions its connection from the first network to the second network. This transition is referred to as a "handoff." Through the use of an inter-technology signaling gateway ("ISG"), a handoff is performed without interruption from the first network running the first technology, e.g., WiMAX, to the second network running a second technology, e.g., EVDO. The ISG performs a handoff between networks running different technologies because the ISG consolidates and implements the handoff standards of different network technologies.

The ISG performs a handoff without interruption to the user by pre-registering the mobile device with the second network. During pre-registration, the ISG acquires "session pre-registration information" from the mobile device by establishing a communication channel with the mobile device and optionally the second network in advance of the handoff. By doing so, the ISG minimizes or eliminates service delays and hang-ups during a handoff. In addition to enabling the pre-registration of the mobile device, the ISG also assists in carrying out the actual handoff to the second network, by exchanging information between the mobile device, the first network, the second network and a "core network," a network providing authentication and service information.

Because the ISG uses existing functions of a network's technology, relatively few or no enhancements are needed in the implementations of the different network infrastructure vendors providing the first network and the second network. For example, existing EVDO functions for inter-subnet handoffs, including "A13" and "A16" interface protocols, are used for active or dormant session transfer between the ISG a second network running EVDO, resulting in a handoff between the first network and the second network.

As the ISG consolidates and implements the handoff functionality for handoffs between the first network and the second network (in either direction) and leverages existing functions and interfaces to communicate with the first network and the second network, the ISG reduces (e.g., eliminates) the need to implement extra inter-working functionality or purchase such extra equipment and reduces network operators' capital and operational expenses. Because the ISG interfaces with numerous different technologies, the ISG may reduce latency and delays for pre-registration of a mobile device's session and for the actual handoff execution.

Figure 1:
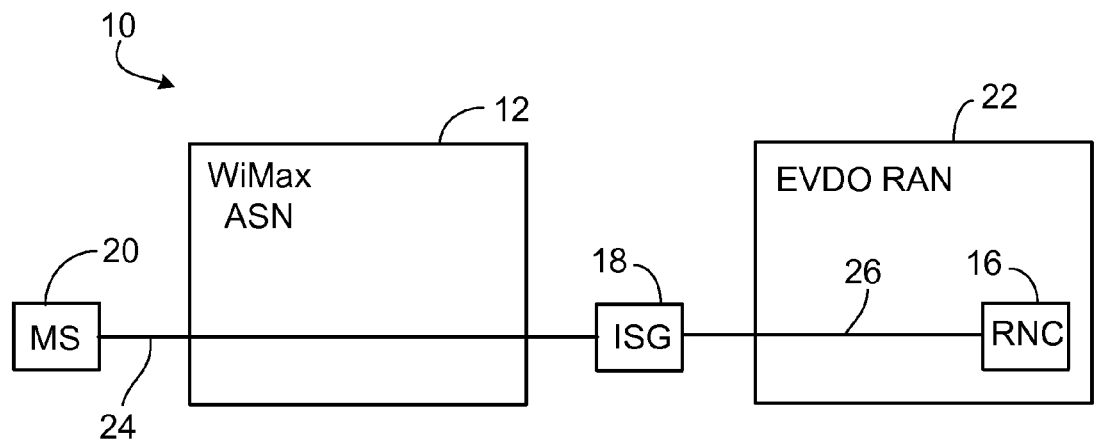
FIG. 1 is a block diagram of an inter-technology architecture for networks using different technologies.

Referring to FIG. 1, an inter-technology architecture 10 includes a WiMAX network 12 (in another example the network 12 may be an LTE radio access network ("RAN"), an EVDO network 22 and an ISG 18. The ISG 18 interfaces with the WiMAX network 12 and the EVDO network 22 for facilitating a handoff of a mobile device 20 from the WiMAX network 12 to an EVDO network 22 or from an EVDO network 22 to the WiMAX network 12.

Before a handoff, the ISG 18 establishes a communication channel 24 with the mobile device 20 through the WiMAX network 12. The ISG 18 may also establish a communication channel 26 with the EVDO network 22. The ISG 18 consolidates the handoff functionality needed to handoff a mobile device's session from one network (e.g., the WiMAX network 12) to another network (e.g., the EVDO network 22), such that that networks may use existing interface protocols and do not need to make changes to the existing interface protocols.

Figure 2:
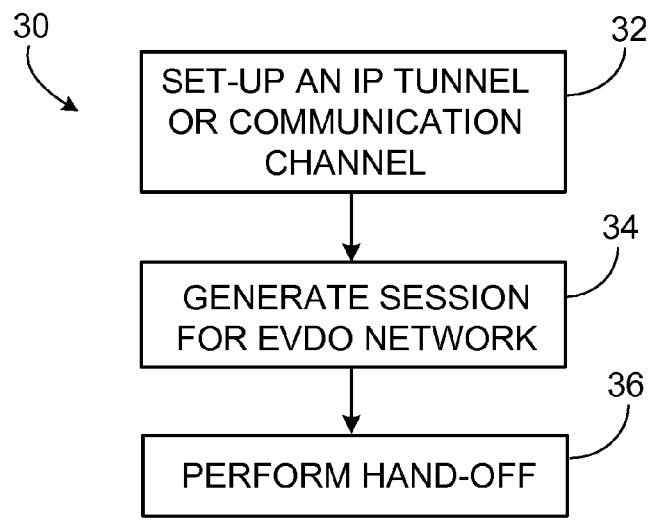
FIG. 2 is a block diagram of actions performed in handing off a mobile device from a first network to a second network.

Referring to FIG. 2, the WiMAX ASN 12 and ISG 18 perform various actions (30) in handing off the mobile device from one network (e.g., the WiMAX network 12 or an LTE network) to another network (e.g., the EVDO network 22). The WiMAX ASN 12 sets-up (32) the communication channel 24 to the ISG 18. Through the communication channel 24, the mobile device 20 sends the ISG 18 information needed to prepare the EVDO network 22 for a handoff. The ISG 18 communicates with the EVDO network 22 using the EVDO communication protocols, including A13 or A16 interface protocols. Using these interface protocols, the ISG 18 configures the session and traffic channels with the EVDO network 22 during the handoff of the mobile device 20.

Using the session pre-registration information, the ISG 18 generates (34) an active session associated with the mobile device 20 for the EVDO network 22 (for when the mobile device 20 physically attaches to the EVDO network 22.) The session pre-registration information is used to ensure that an active session for the mobile device 20 exists in the EVDO network 22. Because a session for the mobile device 20 has already been setup on the EVDO network 22 as part of the handoff, a handoff initiated by the ISG 18 does not disrupt IP services being used at the time on the mobile device 20, and therefore appears seamless or invisible to the user at the mobile device 20.

Additionally, the ISG 18 performs (36) the handoff of the mobile device from the WiMAX network 12 to the EVDO network 22 by transferring the session generated for the EVDO network 22, as discussed in further detail below with regard to FIG. 4.

Figure 3:
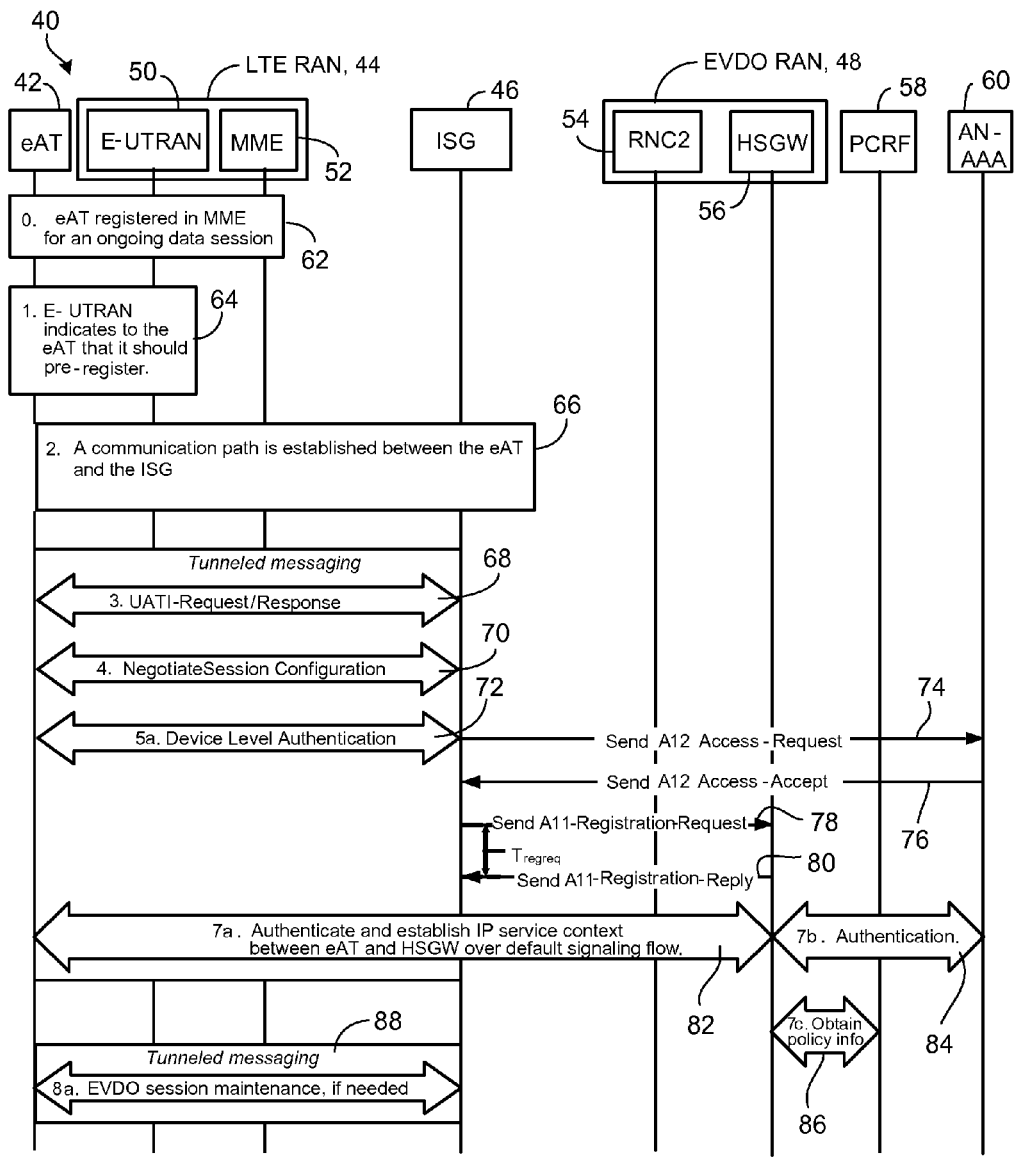
FIG. 3 is a flow diagram of a pre-registration call flow.

Referring to FIG. 3, various actions (40) are performed by a mobile device ("eAT") 42, a LTE network 44, an ISG 46 integrated with the LTE network 44 and an EVDO network 48 in pre-registering a session with the EVDO network 48 for handoff from the LTE network 44 to the EVDO network 48. The pre-registration of the session with the EVDO network 48 reduces setup time and handoff latency when the handoff actually occurs.

The LTE network 44 includes an LTE access network ("E-UTRAN") 50 and another component, a Mobility Management Entity ("MME") 52. The EVDO network 48 includes a radio network controller ("RNC") 54 and a gateway ("HSGW") 56. In addition to the EVDO network 48, a "core network" is also provided by a service provider. The core network provides the ISG 46 with basic information about the services, application and IP connections available to the mobile device 42. The service provider's "core network" includes a Policy and Charging Rules Function ("PCRF") server 58 and an access network-authentication, authorization and accounting server ("AN-AAA") 60. The mobile device 42 is initially registered (62) with the MME 52 of the LTE network 44 for an ongoing data session in which the mobile device 42 uses the LTE network 44 for communications and IP services.

As the mobile device 42 moves out of the LTE network 44 coverage area and into the EVDO network 48 coverage area, the LTE network 44 determines that the mobile device 42 needs to handoff its session to the EVDO network 48 to continue receiving service. To notify the mobile device 42 that it should pre-register with the EVDO network 48 in preparation for a handoff to the EVDO network 48, the E-UTRAN 50 of the LTE network 44 sends (64) a broadcast message to the mobile device 42. In another example, the mobile device 42 autonomously makes this determination that it needs to pre-register with the EVDO network 48.

As part of pre-registration, the mobile device 42 issues a domain name system ("DNS") query to a DNS server in the core network associated with the LTE network 44. The DNS server looks up the IP address associated with the ISG 46 and sends the mobile device 42 a message including the IP address of the ISG 46. Using the IP address of the ISG 46, the mobile device 42 sends a message to the ISG 46 requesting that the ISG 46 establish a communication channel between the ISG 46 and mobile device 42.

The ISG 46 establishes (66) a communication channel 24 (FIG. 1) between the mobile device 42 and itself by opening up a port on the ISG 46 to send and receive data packets to and from the mobile device 42. In one example, the communication channel 24 is a "S101 tunnel," which is a communication channel defined by the EVDO standard. The communication channel is established over the LTE network 44, because the mobile device 42 is still connected to the LTE network 44.

Through the communication channel established by the ISG 46, the LTE network 44 and the ISG 46 send and receive messages including session pre-registration information for the pre-registration of the session on the EVDO network 48. The format employed by the messages is common session setup mechanisms defined by the EVDO network 48, because the session pre-registration information is used by the ISG 46 to establish a session for the EVDO network 48.

To obtain the session pre-registration information, the ISG 46 sends (68) the mobile device 42 a request for the unique access terminal identifier ("UATI") associated with the mobile device 42. The mobile device 42 sends (68) its UATI to the ISG 46 over the communication channel established (66) by the ISG 46. In this example, the ISG 48 requests session pre-registration information from the mobile device 42 that is specific to the EVDO interface, such as the UATI, so that the information received from the mobile device 42 is useable in pre-registering the session with the EVDO network 48.

To provide continuity between the session on the LTE network 44 and on the EVDO network 48, the ISG 46 negotiates (70) session context information with the mobile device 42. As used herein, the term "session context information" may also include and/or refer to, without limitation, location information and security information. The session context information includes services that the mobile device 42 is currently accessing or using, e.g., voice over IP and telephony services. The ISG 46 negotiates the session context information by sending the mobile device 42 numerous messages, including session context request messages. In response, the mobile device 42 sends the ISG 46 session context response messages, including the parameters (e.g., window length of the session) and various layers (e.g., session layer, protocol layer, and connection layer) associated with the session on the LTE network 44. The ISG 46 uses this session context information in both pre-configuring the EVDO network 48 for the handover of the session on the LTE network 44 and performing the handoff of the session to the EVDO network 48.

The ISG 46 also authenticates (72) the mobile device to verify that a user of the mobile device 42 is a paid subscriber of the EVDO network 48 and has permission to use the EVDO network 48. Through the communication channel 24 (FIG. 1), the ISG 46 sends the mobile device 42 a request for a hardware identifier associated with the mobile device 42. The mobile device 42 sends the ISG 46 a message including the hardware identifier associated with the mobile device 42.

The ISG retrieves device level authentication information from the AN-AAA 60 using known standards, including the "A12" interface protocol, which is the interface between the EVDO network 48 and the AN-AAA 60. The ISG 46 establishes a connection with the AN-AAA 60 and sends (74) the AN-AAA an A12 access request message using the hardware identifier received from the mobile device 42. The AN-AAA 60 sends (76) the ISG 46 an A12 access accept message or an A12 access deny message, indicating whether the mobile device 42 is authenticated to access the EVDO network 48.

The ISG 46 implements existing protocols and connection types supported by EVDO to establish IP flows (e.g., IP data pipes) with the HSGW 56. The protocol used to establish EVDO IP flows is referred to as the "A11" interface protocol. Messages sent using the A11 interface protocol are referred to as "A11 registration request" and "A11 registration response" messages. The IP connections established through the use of the A11 interface protocol are referred to as "A10" connections.

The ISG 46 sends (78) an A11 registration request message to the HSGW 56. The A11 registration request message signals to the HSGW 56 that the HSGW 56 should establish a data pipe with the Internet in preparation for the handoff of the session to the EVDO network 48. In response, the HSGW 56 sends (80) the ISG 46 an A11 registration response message indicating that the data pipe has been successfully established.

In addition to the device level authentication, the ISG 46 performs (82) user level authentication to determine "IP service context," the level of service (e.g., gold service level or platinum service level) and user applications (e.g., games and on-line shopping services) available to the mobile device 42 on the EVDO network 48. The ISG 46 performs user level authentication by sending and receiving a series of authentication messages to and from the HSGW 56. The authentication messages include a unique user identifier to identify the user of the mobile device 42.

The HSGW 56 authenticates (84) the user associated with the mobile device 42 by sending the AN-AAA 60 an authentication request message including the unique user identifier. Based on the unique user identifier, the AN-AAA 60 authenticates that the user is authorized to access the EVDO network 48. The AN-AAA 60 sends the HSGW 56 a response message including the level of service associated with the authenticated user. The HSGW 56 also receives (86) policy information indicating the services and applications available to the authenticated user from the PCRF 58. This information received from the PCRF 56 and the AN-AAA 60 is sent to the mobile device 42 through the ISG 46 in the form of the IP service context information, thereby completing pre-registration of the mobile device's session with the EVDO network 48.

In some examples, the ISG 46 provides (88) EVDO session maintenance. For example, a user sets up a session with the EVDO network 48 but the session is stopped before a handoff, because the mobile device 42 changes its services or moves to another region. In this example, the ISG 46 updates the session information for the EVDO network 48 using the communication channel 24 (FIG. 1) established by the ISG 46 with the mobile device 42.

Figure 4:
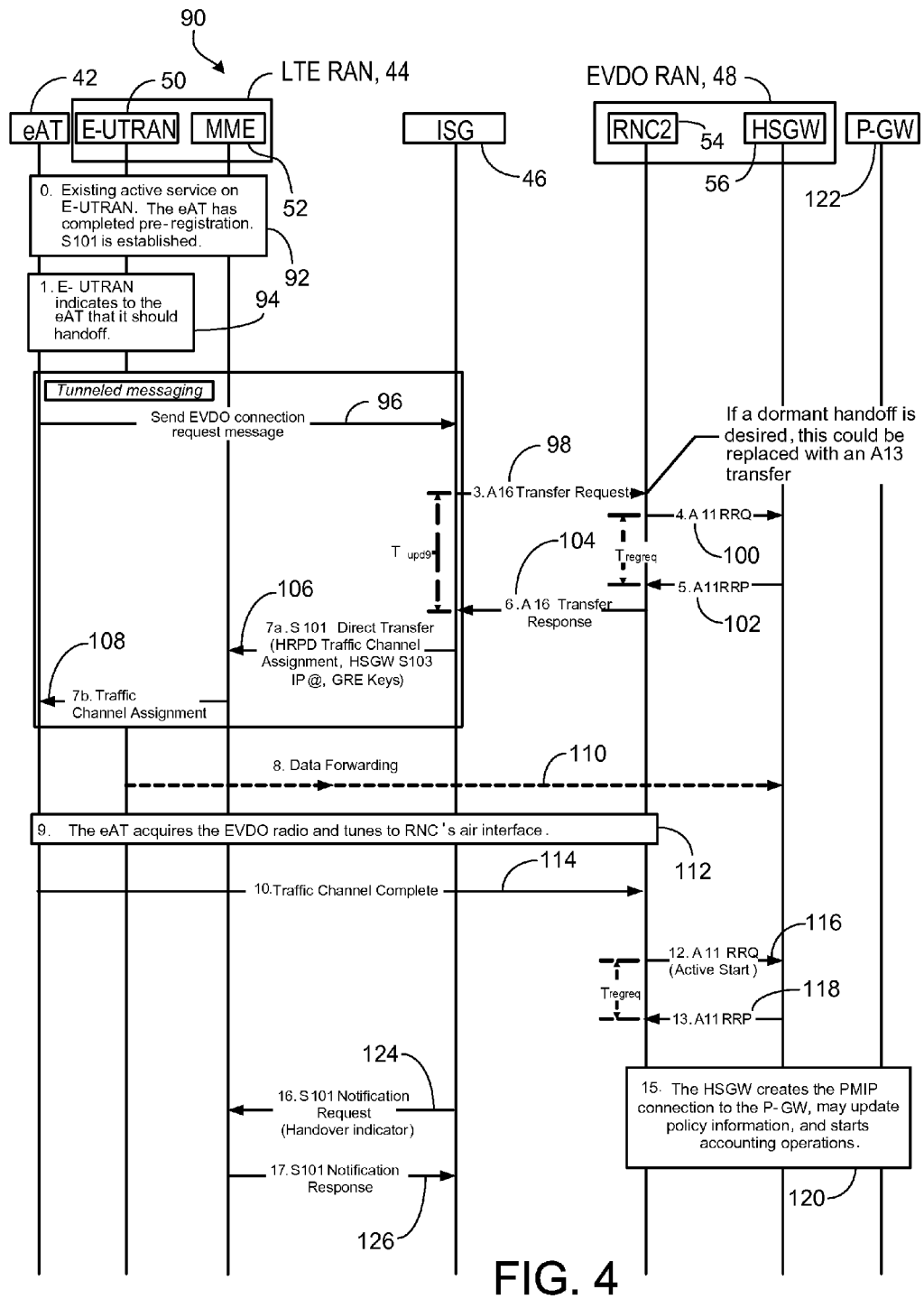
FIG. 4 is a flow diagram of an active handoff call flow.

Referring to FIG. 4, various actions (90) are performed during an active session handoff. The mobile device 42 is connected (92) to the LTE network 44 and the ISG 46 has established (92) the communication channel 24 (FIG. 1) with the mobile device 42

As the LTE network 44 senses that the mobile device 42 is about to move beyond the LTE network's area of coverage, the E-UTRAN 50 of the LTE network 44 sends (94) the mobile device 42 a message indicating that that the mobile device 42 should handoff the mobile device's session to the EVDO network 48. In some examples, the mobile device 42 makes this determination autonomously.

The mobile device 42 sends (96) an EVDO connection request message directed to the ISG 46 to indicate that the mobile device 42 wants to perform a handoff to the EVDO network 48. The connection request message is relayed to the ISG 46 through the communication channel 24, e.g., S101 tunnel. In some examples, the EVDO connection request message is received by the MME 52 and is then forwarded to the ISG 46.

After the ISG 46 has received the EVDO connection request message, the ISG 46 and the EVDO network 48 implement existing protocols supported by EVDO for transferring an active session from one RNC to another RNC on an EVDO network. The protocols are referred to as "A16" interface protocols and are used for active handoffs. The ISG 46 performs an active session handoff for the mobile device 42 to the EVDO network's RNC 54 using the A16 interface protocol. The ISG 46 sends (98) the RNC 54 an A16 interface transfer request message, which includes the session information obtained by the ISG 46 during pre-registration of the session with the EVDO network 48.

In some examples, the mobile device 42 performs a handoff of its session while the mobile device 42 is in a dormant state. In this example, EVDO's "A13" interface protocol is used to perform a dormant session handoff for the mobile device 42 to the EVDO network's RNC 54.

The RNC 54 receives the A16 interface transfer request message and records or saves the session information included in the message to a data repository or a short term memory cache. The RNC 54 also locates resources, including channel resources and link resources, needed to set up a connection with the mobile device 42.

The EVDO network's RNC 54 also sets up IP flows and an A10 connection to the HSGW 56. The RNC 54 sends (100) the HSGW 56 an A11 registration request ("RRQ") message to move the A10 connection (established during pre-registration, see FIG. 3) from the ISG 46 to the RNC 54. The HSGW 56 sends (102) the RNC 54 an A11 registration response ("RRP") message, which indicates that the A10 connection has been successfully transferred to the RNC 54.

The RNC 54 notifies the ISG 46 that the session with the mobile device 42 was setup correctly by sending (104) the ISG 46 an A16 transfer response message, which includes the connection setup information. The connection setup information includes information about the connection and how the mobile device 42 sets up the connection with the EVDO network 48, the assignment methods to implement, the sectors of the EVDO network 48 providing service and so forth. This connection setup information is communicated to the mobile device 42 in a message, e.g., an EVDO "traffic assignment" message. Over the communication channel 24 (FIG. 1), the ISG 46 sends (106) the MME 52 of the LTE network 44 a traffic assignment message directed to the mobile device 42. The MME 52 then forwards (108) the traffic assignment message to the mobile device 42. In preparation for the mobile device 42 to drop its connection to the LTE network 44, the LTE network 44 forwards (110) any remaining session information or data to the HSGW 56.

The mobile device 42 receives the traffic assignment message sent by the ISG 46. Based on the sectors of the EVDO network 48 providing service (as indicated in the traffic assignment message), the mobile device 42 opens (112) a connection with the EVDO network 48. At this point, the mobile device 42 has handed off its communication session from the LTE network 44 to the EVDO network 48. In doing so, the mobile device 42 releases any remaining connections to the LTE network 44. Additionally, the mobile device's radio is tuned to stop listening for frequencies associated with the LTE network 44 and to start listening for frequencies associated with the EVDO network 48. The mobile device 42 acquires the EVDO network's radio frequencies and tunes to the RNC's air interface.

The mobile device 42 notifies (114) the RNC 54 that the mobile device 42 acquired a connection to the EVDO network 48 through a traffic channel and that the handoff was successful. In some examples, the mobile device 42 notifies the RNC 54 by sending the RNC 54 an acknowledgement message.

The IP flows and the A10 connection are updated for billing, accounting and auditing purposes, thereby allowing the EVDO network service provider to track the mobile device's usage of the EVDO network 48. The IP flows and the A10 connection to the HSGW 56 are updated by the RNC 54 sending (116) the HSGW 56 an A11 RRQ message to notify the HSGW 56 that the mobile device 42 is connected to and receiving services from the EVDO network 48. The HSGW 56 sends (118) the RNC 54 an A11 RRP message, indicating receipt of the RNC's RRQ message. Additionally, the HSGW 56 establishes (120) a Proxy Mobile Internet Protocol ("PMIP") connection to a gateway "P-GW" server 122 in the core network to receive background information, including accounting and policy information, associated with the mobile device 42.

Because the handoff from the LTE network 44 to the EVDO network 48 has occurred, the communication channel 24 (FIG. 1) established between the mobile device 42 and the ISG 46 is released. The ISG sends (124) a release message, e.g., a "S101 Notion Request" message, to the MME 52. The MME 52 responds by sending (126) the ISG 46 a notification message, e.g., a "S101 Notification Response" message, indicating that the E-UTRAN 50 and the MME 52 have released the resources associated with the ISG 46 and have closed the communication channel 24.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

A number of embodiments have been described. Nevertheless, it will be understood that various modifications may be made and therefore other embodiments are within the scope of the following claims. For example, the techniques described here are applicable to CDMA and non-CDMA air interface technologies.

Additionally, embodiments include one or more of the following. The user may be dormant or active. In a dormant handoff example, the ISG 46 and the RNC 54 communicate using the A13 protocol interface, instead of the A16 protocol interface. Additionally, the EVDO connection request message 96 (see FIG. 4) is sent after the ISG 46 receives an A13 transfer response message from the RNC 54 104 (see FIG. 4).

The ISG may be adapted for handoffs using different technologies on different networks. For example, the first technology on a first network may be 3rd Generation Partnership Project ("3GPP") LTE (or Evolved UMTS Terrestrial Radio Access Network "E-UTRAN") and the second technology on a second network may be 3GPP2 EVDO. The first technology may be 3GPP2 EVDO and the second technology may be 3GPP LTE. The first technology may be IEEE 802.16e (WiMAX) and the second technology may be 3GPP2 EVDO. The first technology may be 3GPP2 EVDO and the second technology may be IEEE 802.16e (WiMAX). The first technology may be any new wireless technology and the second technology may be an existing technology (for example, 3GPP2 EVDO). The first technology may be an existing technology (for example, 3GPP2 EVDO) and the second technology may be any new wireless technology. The first technology network may consist of different implementations provided by multiple network infrastructure vendors. The second technology network may consist of different implementations provided by multiple network infrastructure vendors.

Additionally, although the architecture shown in FIG. 1 relates to an inter-working between a WiMAX network and an EVDO network, it may also be adapted for other networks using different technologies, including EVDO to LTE; WiMAX to EVDO; and EVDO to WiMAX, LTE to eHRPD among others.

Furthermore, the ISG may be integrated into either of the first or second networks. For example, the architecture shown in FIG. 1 could be modified to integrate the ISG into the EVDO network. In WiMAX/EVDO inter-working configurations, the ISG could be integrated in either the WiMAX network or the EVDO network.

Other embodiments are within the scope of the claims.

What is claimed is:

1. A method comprising:
receiving, by a gateway device from a mobile device, a request to handoff, from a first network for implementing a first technology to a second network for implementing a second technology that differs from the first technology, a communication session associated with the mobile device;
wherein the gateway device is configured to implement handoff standards for at least the first and second technologies and is further configured to interface with the first network and the second network;
establishing, by the gateway device, a communication channel with the mobile device through the first network;
receiving, through the communication channel by the gateway device, session information for the communication session;
registering, by the gateway device based on the session information, the mobile device with the second network; and
enabling, based on registering the mobile device with the second network and by the gateway device, the handoff of the communication session from the first network to the second network.

2. The method of claim 1, wherein one or more signaling messages received from the mobile device comprise the session information.

3. The method of claim 1, further comprising:
generating, based on the session information, a message using a format defined by the second technology;
wherein registering comprises:
preparing the second network for the handoff of the communication session to the second network by transferring the message to the second network.

4. The method of claim 1, further comprising:
sending, to an authorization server, a message to authenticate permission of the mobile device to access the second network.

5. The method of claim 1, further comprising:
receiving, from the second network, one or more of connection setup information and resource allocation information for establishing a connection with the second network; and
forwarding the received information to the mobile device through the communication channel.

6. The method of claim 1, wherein the first network comprises one or more implementations of the first technology provided by one or more network infrastructure vendors.

7. The method of claim 1, wherein the second network comprises one or more implementations of the second technology provided by one or more network infrastructure vendors.

8. The method of claim 1, wherein one or more of the first technology and the second technology comprise one or more of a LTE technology, an E-UTRAN technology, an EVDO technology, a WiMAX technology, a WiFi technology, an Universal Mobile Telephone System ("UMTS") technology, a High-Speed Downlink Packet Access ("HSDPA") technology, and a High Speed Uplink Packet Access ("HSUPA") technology.

9. The method of claim 1, wherein the handoff of the communication session from the first network to the second network is enabled using one or more:
interface protocols associated with one or more of the first network and the second network, inter-subnet interface protocols, inter-node handoff interface protocols and mobility interface protocols.

10. The method of claim 1, wherein the communication channel comprises a first communication channel, the handoff comprises a first handoff and the method further comprises:
establishing a second communication channel with the mobile device through the first network; and
enabling, through the second communication channel, a second handoff of the second communication session associated with the mobile device from the first network to a third network, wherein the first handoff and the second handoff are simultaneously enabled.

11. A system comprising:
a gateway device configured to implement handoff standards for at least a first technology and a second technology that differs from the first technology and to interface between a first network and a second network; and
a non-transitory computer-readable storage medium configured to store instructions that are executable by the gateway device to perform operations comprising:
receiving, from a mobile device, a request to handoff a communication session associated with the mobile device from the first network for implementing the first technology to the second network for implementing the second;
establishing a communication channel with the mobile device through the first network;
receiving, through the communication channel, session information for the communication session;
registering, based on the session information, the mobile device with the second network; and
enabling, based on registering the handoff of the communication session from the first network to the second network.

12. The system of claim 11, wherein one or more signaling messages received from the mobile device comprise the session information.

13. The system of claim 11, wherein the operations further comprise:
generating, based on the session information, a message using a format defined by the second technology;
wherein registering comprises:
preparing the second network for the handoff of the communication session to the second network by transferring the message to the second network.

14. The system of claim 11, wherein the operations further comprise:
sending, to an authorization server, a message to authenticate permission of the mobile device to access the second network.

15. The system of claim 11, wherein the operations further comprise:
receiving, from the second network, one or more of connection setup information and resource allocation information for establishing a connection with the second network; and
forwarding the received information to the mobile device through the communication channel.

16. A non-transitory computer-readable storage medium configured to store instructions that are executable, by a gateway device configured to implement handoff standards for at least a first technology and a second technology that differs from the first technology and further configured to interface between a first network and a second network, to perform operations comprising:
- receiving, from a mobile device, a request to handoff a communication session associated with the mobile device from the first network for implementing the first technology to the second network for implementing the second technology;
- establishing a communication channel with the mobile device through the first network;
- receiving, through the communication channel, session information for the communication session;
- registering, based on the session information, the mobile device with the second network; and
- enabling, based on registering the handoff of the communication session from the first network to the second network.

17. The non-transitory computer-readable storage medium of claim 16, wherein one or more signaling messages received from the mobile device comprise the session information.

18. The non-transitory computer-readable storage medium of claim 16, wherein the operations further comprise:
- generating, based on the session information, a message using a format defined by the second technology;
- wherein registering comprises:
  - preparing the second network for the handoff of the communication session to the second network by transferring the message to the second network.

19. The non-transitory computer-readable storage medium of claim 16, wherein the operations further comprise:
- sending, to an authorization server, a message to authenticate permission of the mobile device to access the second network.

20. The non-transitory computer-readable storage medium of claim 15, wherein the operations further comprise:
- receiving, from the second network, one or more of connection setup information and resource allocation information for establishing a connection with the second network; and
- forwarding the received information to the mobile device through the communication channel.

\* \* \* \* \*

UNITED STATES PATENT AND TRADEMARK OFFICE
CERTIFICATE OF CORRECTION

PATENT NO. : 8,428,601 B2  
APPLICATION NO. : 12/776164  
DATED : April 23, 2013  
INVENTOR(S) : Prince Samar Page 1 of 1

It is certified that error appears in the above-identified patent and that said Letters Patent is hereby corrected as shown below:

In the Claims:

Column 14, Line 16, In Claim 20, delete "claim 15," and insert -- claim 16, --, therefor.

Signed and Sealed this
Thirteenth Day of August, 2013

Teresa Stanek Rea
*Acting Director of the United States Patent and Trademark Office*